United States Patent Office 3,481,343
Patented Dec. 2, 1969

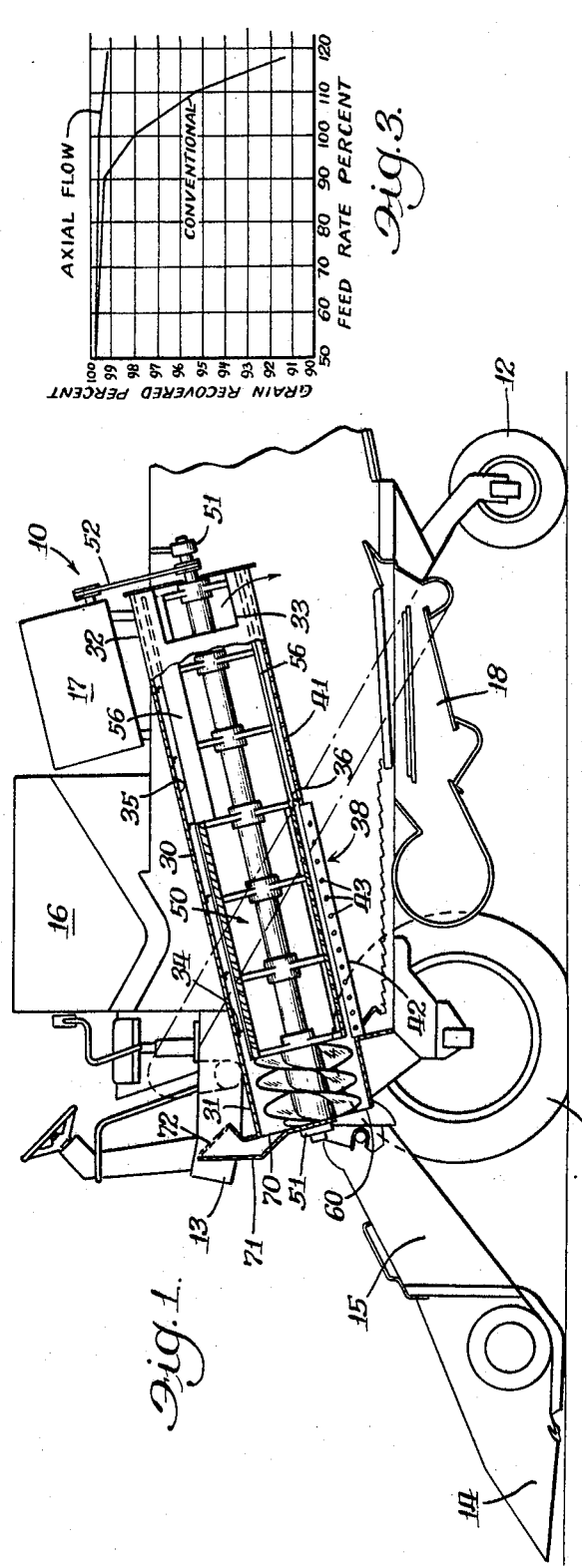
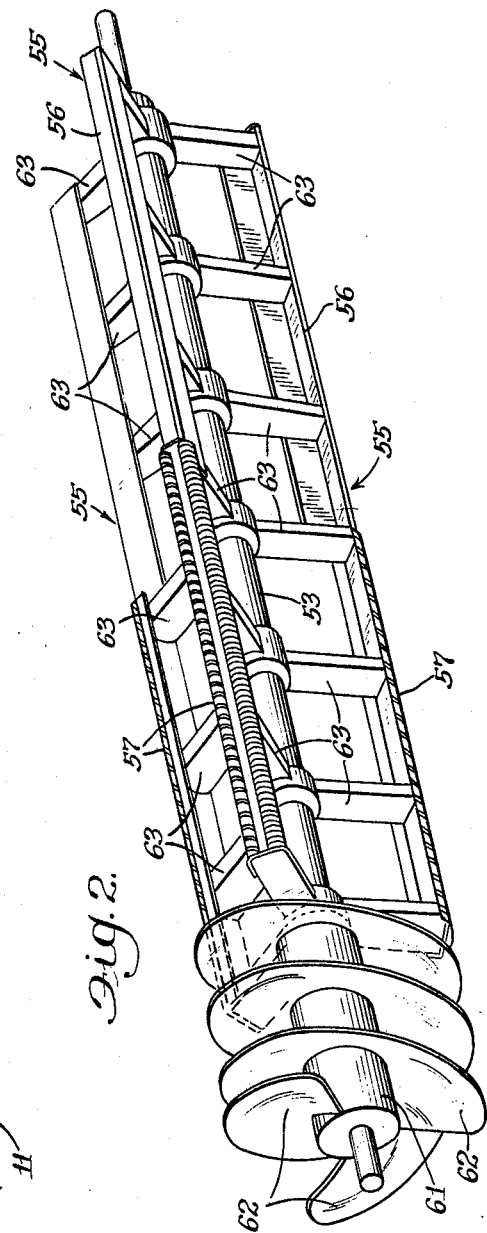

3,481,343
AIR CHUTE FOR AXIAL COMBINE
Ernest M. Van Buskirk, East Moline, Ill., assignor to International Harvester Company, Chicago, Ill., a corporation of Delaware
Filed Sept. 23, 1966, Ser. No. 581,607
Int. Cl. A01f *12/24, 7/00;* A01d *41/02*
U.S. Cl. 130—27
2 Claims

ABSTRACT OF THE DISCLOSURE

An axial flow combine having an air inlet in the front end of the cylinder to supplement the axial air current flowing towards the rear of the cylinder. The air inlet eliminates reverse direction eddy current and the corresponding accumulation of material below the front end of the cylinder.

---

The present invention relates generally to improvements in combines and the like and more particularly to a new and improved rotary or axial flow-type combine in which the material flows axially of an open rotor.

In all present commercially available combines, the material to be threshed is fed between a rotating cylinder and a stationary concave in a direction normal to the axis of the rotating cylinder. Much of the grain contained in the material fed to the cylinder and concave passes through the concave as threshed grain. The remainder of the material is conveyed to the separating component of the combine which in conventional combines includes reciprocating or oscillating straw racks, return pans, and chaffer sieves. The subject invention concerns a combine that operates on a completely different principle than the above-described commercially available combines. In the combine described in the subject application an elongated rotor is provided along the longitudinal axis of the combine. The elongated rotor is enclosed within a cylinder having transport fins provided along its upper internal surface and a concave and grate provided along its lower surface. The material to be threshed is fed into the front end of the cylinder and is metered axially towards the rear while being processed by the cooperating elements on the rotor and cylinder. An axial flow-type combine such as this has the obvious advantage over a conventional combine in the simplicity of its drive since it utilizes only simple rotary drives and does not include oscillating or reciprocating elements. This not only simplifies the drive for the separating section, but also reduces vibrations considerably. Furthermore, the elements of an axial flow-type separating section have better structural stability than those of conventional separating section and are thus more durable and reliable. The principle of constructing a combine in which the material flows axially of the rotor is not entirely new. A threshing machine such as this is shown, for example, in the patent to Schlayer 1,688,662 of Oct. 23, 1928. Although the basic principle is old, machines of this type have never enjoyed commercial success.

One of the reasons for this failure is that an axial flow-type threshing machine requires more power per unit of clean grain than does the conventional combine. With more powerful engines and better drive members now available, this drawback has become less important. The availability of light weight, economical, larger power plants and more efficient power trains has also fostered a trend to build combines of greater capacity. The capacity of machines such as a combine can be increased by providing wider grain heads for the machine so that its swath is increased and also by increasing the forward speed of the combine. Generally speaking, the capacity of the various elements of the combine have been increased to handle the added capacity by merely enlarging them, however, there is a practical limit to how large and how heavy a combine can be built. Combines must be of a size and weight such that they can be operated under soft muddy field conditions. Also, since they must be shipped from the manufacturing plant to the user and since they must be transferred from one field to another, the machine must be of a size and weight that can be conveniently transferred over the highways and by rail. The maximum weight permitted on highways, the maximum width and height of bridges and viaducts that are likely to be encountered, restrict the overall size and weight dimensions of a combine. Once these maximum dimensions have been reached, it is no longer a simple matter to increase the capacity of a combine as it is now necessary to increase the efficiency of the various elements of the combine without a corresponding increase in size or weight.

It has been found that the separating section of the conventional combine has an efficiency curve that changes at a very low rate until the combine feed rate exceeds a set amount. After this point, the efficiency curve of the conventional separating section changes quite steeply. Thus when using a conventional combine and it is desired to keep the grain losses within an acceptable range (for example 2%), it is necessary that the feed rate through the combine must be maintained within the flat portion of the efficiency curve. It has been found that separating units of the axial flow-type construction are more efficient at a given feed rate than are conventional separators at equal feed rates. Also, it has been found that an axial flow-type separator compares in size and weight to a conventional combine separator.

The grain recovered percent (percent of grain fed into combine that reaches grain tank) has been plotted against the feed rate percent for the largest combine presently sold by International Harvester Company and also for an axial flow-type combine. The graph is shown as FIGURE 3. The graph illustrates that the grain recovered percent in the conventional and the axial flow-type machines are comparable for feed rates less than 100% of the conventional combine. However, as the feed rate increases beyond this reference point, the percent of grain recovered in the conventional machine changes rapidly while the percent of grain recovered in the axial flow-type changes very little. When the conventional machine is recovering 98% of the grain, it is considered to be operating at 100% of its feed rate. When operating the axial flow-type machine in the same field under identical test conditions at a feed rate equal to what is considered to be 100% of the conventional it recovers 99.4% of the grain. A comparison of these performance curves illustrate that at lower feed rate percents, the difference between the grain recovered percents are less. However, as the feed rate exceeds this reference point, the difference widens rapidly. For example, when the combines are operating at feed rates of 110%, the conventional recovers 95.2% and the axial flow-type recovers 99.3% of the grain. Thus it is seen that the axial flow-type machines are desirable if the feed rates of combines are to be increased.

During threshing and separating, there is created a large amount of light material classified as chaff and fines. In a conventional combine, some of the chaff and fines is discharged with the straw and some is collected with the uncleaned grain. The conventional combine is provided with a cleaning system to separate the chaff and fines from the grain and to deposit the clean grain in the grain tanks. As an example when operating in a field where one-half of the crop by weight is grain and the other half is waste, for every 6.4 pounds of material fed into a conventional combine, approximately 2.2 pounds of material will be discharged as waste over the straw walkers and 1 pound of material will be discharged as waste through the cleaning system. The grain tank, in this example, will receive 3.2 pounds of clean grain. In this example 4.2 pounds of material were processed through the cleaning system and 1.0 pound of this was discharged as waste. The cleaning system on conventional combines are built to handle material having this ratio of waste to clean grain. The effectiveness of conventional combine cleaning systems improve as the ratio of waste to clean grain is decreased or minimized.

Another reason for the failure of the axial flow-type combine as a commercially acceptable machine is now thought to be attributed to its characteristic of separating a larger percentage of chaff with the uncleaned grain than does the conventional combine. As a second example, an axially flow-type combine of the type shown in the above-referred to Schlayer patent, operating in the same field of the first example, might divide every 6.4 pounds of unthreshed material into 1.6 pounds of material to be discharged as waste through the straw discharge, and 1.6 pounds of material as waste through the combine cleaning system. In this second example, 4.8 pounds of material must be processed through the cleaning system to salvage 3.2 pounds of clean grain. Thus this machine would require a cleaning system that is more effective than the cleaning system of a conventional combine. For this reason, for an axial flow-type machine to compare favorably with a conventional combine, it must be improved such that it will discharge more of the chaff with the straw and thus not require a more effective cleaning system of a greater capacity than a corresponding conventional combine. It is believed that the rotors in the prior art axial flow-type threshing machine functioned as centrifugal fans creating an air current flowing through the grate located in the bottom portion of the cylinder. This current of air carried with it the light chaff and fines to thus account for the large quantity of chaff and fines received in the cleaning system. It is the purpose of this invention to provide a rotor that will not create a draft flowing through the cylinder grate and thus permit more chaff and fines to be discharged with the straw. This is particularly critical in the threshing area of the rotor since in this portion, the apertures in a grate are larger than in the separating section of the grate. This objective is accomplished by constructing the rotor of a tubular core having a plurality of flat radial arms lying within the plane of rotation. The plurality of flat radial arms are connected at their free ends by elongated members that are parallel to the core. These elongated members are shaped so that they will not function as fan blades. In the separating area, the shape of the elongated members can be such that some fanning effect is obtained.

In eliminating downdrafts in the threshing area of the rotor eddy currents have been created beneath the concave. The path of material movement in the threshing area of the rotor flows downwardly through the concave and towards the rear of the rotor. However, eddy currents have been found to exist along the outer edges of the concave flowing toward the front of the rotor and upwardly through the concave. These eddy currents carry with them chaff, dust and light grain which are deposited when the current encounters the front wall of the combine and is bent upwardly. This material accumulates beneath the concave and eventually the combine must be shut down and this accumulation of material manually removed. The eddy currents are apparently caused by a vacuum created in a threshing area when the material within the cylinder is fed rearwardly of the rotor. The eddy currents are in effect a stream of air attempting to fill the space left by the rearwardly moving material.

The eddy currents and thus the accumulation of material have been eliminated by providing an air chute through which air can enter the cylinder in the threshing area above the concave. The air chute is vented to the atmosphere and there is less resistance to air flow through the chute than through the creation of eddy currents flowing upwardly through the concave in opposition to the path of material movement. As a result the path of least resistance is followed and clean dust-free air is fed into the cylinder through the air chute.

In the combine disclosed herein, the function of threshing and separating are both performed within the cylinder through the action of the rotor. Conventional rasp bars are mounted axially along the front section of the rotor where the threshing function is performed. By so constructing the threshing and separating section of the combine, there is only one moving part in these sections, the rotor. The drive for rotating the rotor is obviously much simpler than the several drives required in the threshing and separating sections of conventional combines. Thus the machine not only can handle a larger capacity without a corresponding reduction in efficiency but also is simpler and less susceptible to mechanical failures.

An object of the present invention is the provision of an axially flow-type combine having an air chute through which air can enter the cylinder in a threshing area.

Another object is to provide an axially flow-type combine in which the eddy currents flowing upwardly through the concave in the threshing area have been eliminated.

Still another object is to provide an axially flow-type combine in which the vacuum created in the threshing area draws air in through an air chute opening in the cylinder above the concave.

These and other objects of the invention will become more apparent from the specification and drawings wherein:

FIGURE 1 shows a side view of the axial flow-type combine having portions broken away for clarity.

FIGURE 2 is a pictorial view of a preferred embodiment of the rotor; and

FIGURE 3 is a graph comparing performance curves of axial flow and conventional combines.

Referring now to the drawings wherein like reference characters designate like or corresponding parts throughout the several views, there is shown in FIGURE 1, a combine generally designated 10 having drive wheels 11, dirigible wheels 12, an operator's platform 13, a header 14, a feeder 15, a grain storage tank 16, an engine 17, and a conventional cleaning system 18. The combine as seen in FIGURE 1 does not include conventional threshing and separating sections, but rather incorporates the threshing and separating sections into a single unit including an elongated cylindrical member 30 having a rotor 50 mounted therein.

The elongated cylindrical member 30 is arranged along the longitudinal axis of the combine 10 and includes a front end 31 and a rear end 32. The cylindrical member 30 is closed by a front end wall having a material inlet opening 60 formed therein. Material to be threshed is fed into the elongated cylindrical member 30 through the opening 60 in the front end wall. The material fed into the front end of the cylindrical member 30 is processed as it is metered through the member towards the rear end 32. The threshed grain escapes from the elongated cylindrical member 30 through the apertured bottom made up of a concave 38 and grate 41. The straw and other waste material is discharged from the elongated cylindrical member 30 through a straw discharge opening 33 formed in the rear end 32. A plurality of spiral transport fins 34 are secured to the upper internal surface 35 of the cylindrical member 30. The transport fins function to index the material axially through the cylindrical member from the front end to the rear end.

The lower surface 36 of the elongated cylindrical member 30 has an irregularly shaped internal surface and has apertures formed therein. The apertures are of a size to permit the passage of grain therethrough. The lower surface 36 is divided into a front threshing area that is in the form of a conventional concave. The lower surface 36 also includes a rear separating area including a removable or interchangeable perforated sheet or grate 41 that is normally less aggressive than the concave 38 and has smaller apertures. The concave 38 is of the conventional construction including a plurality of parallel ribs 42 having apertures therein through which a plurality of wires 43 are threaded. The grate 41 is made from a perforated sheet of material and is interchangeable so a grate having the appropriate size apertures can be installed for the particular crop being harvested.

The rotor 50 is journalled for rotation in the elongated cylindrical member 30 by bearings 51 and is drivingly connected to the engine 17 by a drive designated 52. This rotor 50 includes a plurality of blades 55, a tubular core 53 and short front helices 54 that are secured to the tubular core 53 at its front end. The helix 54 includes a drum 61 and an individual helix flight 62 for each of the blades 55. Thus if the rotor 50 has two blades 55, there will be two separate short front helices 62 and if the rotor 50 includes three blades, there will be three short front helices 62. Each of the blades 55 of the rotor 50 are made up of a plurality of radially extending arms 63 arranged in groups lying in planes parallel to the rotor axis. The radially extending arms 63 have free ends that are connected by longitudinally extending members 56. The portion of the longitudinally extending member 56 spanning the threshing area of the cylindrical member is shaped such that upon rotation of the rotor, there will be no fanning effect and thus in this area of the cylindrical member, there will be no radial stream of air flowing through the concave 38. The portion of the longitudinally extending member 56 spanning the separating area 41 of the cylindrical member 30 is shown in the drawings to be of a shape that could produce a slight fanning effect since a downdraft of air is less critical in this area. Aggressive means such as conventional rasp bars 57 are secured to the outer surfaces of the longitudinally extending members 56 in the threshing area of the cylindrical member 30. When the rotor 50 revolves, the rasp bars 57 in cooperation with the concave 38 function to thresh the material being fed axially of the rotor 50.

An air intake opening 70 is formed in the upper portion of front end 31 of cylindrical member 30. An upwardly extending duct 71 is connected to the cylinder 30 about opening 70 and terminates in an open end portion 72. During operation of the combine there is normally a cloud of dust adjacent the header 14 engulfing the connection between the feeder 15 and the cylindrical member 30. The duct 71 acts as a snorkel so that the air entering cylindrical member 30 through opening 70 is relatively clean and dust free.

The threshed and separated grain passing through the concave 38 and grate 41, respectively, is then processed through the conventional cleaning unit 18 after which it is elevated and deposited in the grain tank 16.

It should be understood, of course, the foregoing disclosure relates to only a preferred embodiment of the invention and that numerous modifications or alterations may be made therein.

What is claimed is:
1. A harvester thresher constructed about a longitudinal axis;
an elongated cylinder arranged with its axis substantially along said longitudinal axis, said elongated cylinder having a front end and a rear end,
the front end of said elongated cylinder being closed by a front end wall, a material inlet opening formed in said front end wall,
the bottom section of said cylinder formed to permit the passage of grain and chaff,
transport fins secured to the upper internal surface of said cylinder,
an air intake formed in the upper portion of said front end, and
a trash discharge opening formed in said rear end;
a header including a feeder portion, said feeder portion connected to said front end and adapted to feed unthreshed material axially through said inlet opening, into said cylinder in a direction axially thereof;
a rotor coextensive to and journalled for rotation within said cylinder, said rotor including a short helix at its front end that acts on the unthreshed material causing it to move toward said rear end,
a plurality of outwardly extending arms, said arms terminating in free ends adjacent the internal surface of said cylinder, groups of said outwardly extending arms lying in a plane passing through said rotor axis, a longitudinally extending member associated with each of said groups and secured to the free ends of the arms of its associated group, aggressive means secured to the outer surface of said members,
said rotor and said cylinder cooperating to thresh and separate the grain from the unthreshed material, permitting the grain to pass through the bottom section of said cylinder and causing the trash to be discharged through said trash discharge opening, and also to create an air stream flowing from said air intake opening rearwardly through said trash discharge opening.

2. The invention as set forth in claim 1 wherein a duct is connected to said cylinder about said air intake opening, said duct extending upwardly and opening to the atmosphere at a point remote from the connection between said feeder and said cylinder.

References Cited

UNITED STATES PATENTS

| | | | |
|---|---|---|---|
| 953,833 | 4/1910 | Hollingsworth | 130—27 |
| 990,007 | 4/1911 | Reason | 130—27 |
| 1,174,398 | 3/1916 | Davis | 130—27 |
| 1,744,336 | 1/1930 | Schlayer | 130—27 |
| 1,926,709 | 9/1933 | Bunting | 56—20 |
| 2,321,019 | 6/1943 | Dray | 130—27 |
| 2,377,238 | 5/1945 | Jorg | 130—27 |
| 2,745,409 | 5/1956 | Tillotson | 130—27 |
| 2,796,868 | 6/1957 | Oliver | 130—27 |
| 3,179,111 | 4/1965 | Morrison et al. | 130—27 |

LOUIS G. MANCENE, Primary Examiner

P. A. RAZZANO, Assistant Examiner

U.S. Cl. X.R.

56—21